(12) United States Patent
Minihold et al.

(10) Patent No.: US 7,453,931 B2
(45) Date of Patent: Nov. 18, 2008

(54) METHOD FOR MEASURING THE MODULATION ERROR OF DIGITALLY MODULATED HIGH FREQUENCY SIGNALS

(75) Inventors: Roland Minihold, München (DE); Albert Winter, Forstinning (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 575 days.

(21) Appl. No.: 10/490,595

(22) PCT Filed: Oct. 17, 2002

(86) PCT No.: PCT/EP02/11643

§ 371 (c)(1),
(2), (4) Date: Mar. 23, 2004

(87) PCT Pub. No.: WO03/034678

PCT Pub. Date: Apr. 24, 2003

(65) Prior Publication Data

US 2004/0240537 A1 Dec. 2, 2004

(30) Foreign Application Priority Data

Oct. 17, 2001 (DE) .................... 101 51 173

(51) Int. Cl.
*H04B 3/46* (2006.01)
(52) U.S. Cl. .................... 375/224; 375/371

(58) Field of Classification Search ........... 375/224, 375/226, 240.27, 371, 227, 295, 298, 296, 375/183
See application file for complete search history.

(56) References Cited

U.S. PATENT DOCUMENTS

| | | | |
|---|---|---|---|
| 5,001,724 A | 3/1991 | Birgenheier et al. | |
| 5,187,719 A | 2/1993 | Birgenheier et al. | |
| 5,202,644 A | 4/1993 | Brady | |
| 5,533,048 A * | 7/1996 | Dolan | 375/222 |
| 5,699,179 A * | 12/1997 | Gopalakrishnan | 398/194 |
| 5,760,646 A * | 6/1998 | Belcher et al. | 330/149 |
| 5,768,699 A * | 6/1998 | Behan et al. | 455/296 |
| 5,789,927 A * | 8/1998 | Belcher | 324/622 |
| 5,850,303 A * | 12/1998 | Yamamoto et al. | 398/91 |
| 5,946,359 A | 8/1999 | Tajiri et al. | |
| 6,265,949 B1 * | 7/2001 | Oh | 332/103 |
| 6,271,724 B1 * | 8/2001 | Neffling | 330/149 |
| 6,584,205 B1 * | 6/2003 | Croft et al. | 381/98 |
| 6,765,899 B1 * | 7/2004 | Lundh et al. | 370/342 |
| 7,116,167 B2 * | 10/2006 | Ahn | 330/151 |
| 2002/0015423 A1 * | 2/2002 | Rakib et al. | 370/485 |
| 2004/0233980 A1 * | 11/2004 | Kernchen | 375/224 |
| 2005/0195916 A1 * | 9/2005 | Anvari | 375/295 |

* cited by examiner

*Primary Examiner*—Emmanuel Bayard
(74) *Attorney, Agent, or Firm*—Ditthavong Mori & Steiner, P.C.

(57) ABSTRACT

A method is described for measuring the modulation error in digital modulated high frequency signal, whose amplitude and/or phase is digitally distorted according to a predetermined function, in particular limited by a given clip factor, in which the signal to be measured is compared with a locally generated reference signal that was generated by taking the predetermined distortion function into account.

13 Claims, 1 Drawing Sheet

METHOD FOR MEASURING THE MODULATION ERROR OF DIGITALLY MODULATED HIGH FREQUENCY SIGNALS

FIELD OF THE INVENTION

The invention relates to a method for measuring the modulation error of a digitally modulated high frequency signal, as used, for example, in modern mobile telephone and radio systems.

BACKGROUND OF THE INVENTION

For measurements of modulation errors, measuring devices are already known, wherein an ideal reference signal is generated locally from a knowledge of the bits and the modulation parameters used for the digital modulation of the signal to be measured, such as type of modulation, filter function and symbol rate. The signal to be measured is then compared with the ideal reference signal (e.g. U.S. Pat. No. 5,001,724). In this context, the ideal modulated reference signal is generated in the measuring device either by synthesis or by calculation. With a modulation analyzer of this kind, the modulation error of a high frequency signal digitally modulated in any manner required can be measured and presented separately according to amplitude and phase as an I-error, a Q-error, vector-error amplitude or in a polar presentation as a vector diagram or configuration diagram.

One disadvantage of these known measuring devices is that when measuring signals, of which the amplitude or phase is distorted according to a known function on the digital side in the base band, for example, by being limited to a predetermined clip factor of 64%, a relatively high modulation error is already measured with reference to these signal distortions alone. If, for example, the modulation error of a transmitter power amplifier is to be measured with a known measuring device of this kind, and a distorted high frequency signal of this kind, for example, a clipped signal, is used for this purpose, the modulation error caused by the power amplifier, which is actually supposed to be measured, remains covered beneath the modulation error caused by the distorted measuring signal and can no longer be measured accurately. High frequency signals, which are distorted, for example, clipped, according to a known function, are increasingly used in modern radio systems for various reasons, and the modulation error can accordingly no longer be measured in the above manner. This applies in particular to clipped high frequency signals such as those used in the mobile telephone system IMT2000 of the next mobile telephone generation and/or in digital radio and television, where the modulation error of system components is supposed to be measured directly using the known measuring devices named above.

SUMMARY OF THE INVENTION

A need therefore exists to provide a method, wherein the modulation error of digitally modulated signals, of which the amplitude and/or phase is distorted on the digital side according to a known function, especially by being limited to a predetermined clip factor, can also be measured. This need is addressed on the basis of a method for measuring the modulation error in a digitally modulated high frequency signal by comparing the signal to be measured with a locally generated ideal reference signal, characterized in that, for the measurement of signals, of which the amplitude and/or phase has been distorted on the digital side according to a known function, this known distortion function is also taken into account in the local generation of the reference signal. In one embodiment, the ideal reference signal is generated locally in the measuring device by calculation, and the distortion function to be taken into account can be set manually on the measuring device. In another embodiment, for the measurement of signals, of which the amplitude is limited on the digital side to a predetermined clip factor, this predetermined clip factor is also taken into account in the local generation of the reference signal.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

One exemplary embodiment is explained in greater detail below with reference to the drawings. The drawings are as follows.

DETAILED DESCRIPTION OF THE PREFERRED EMBODIMENT

Figure 1:
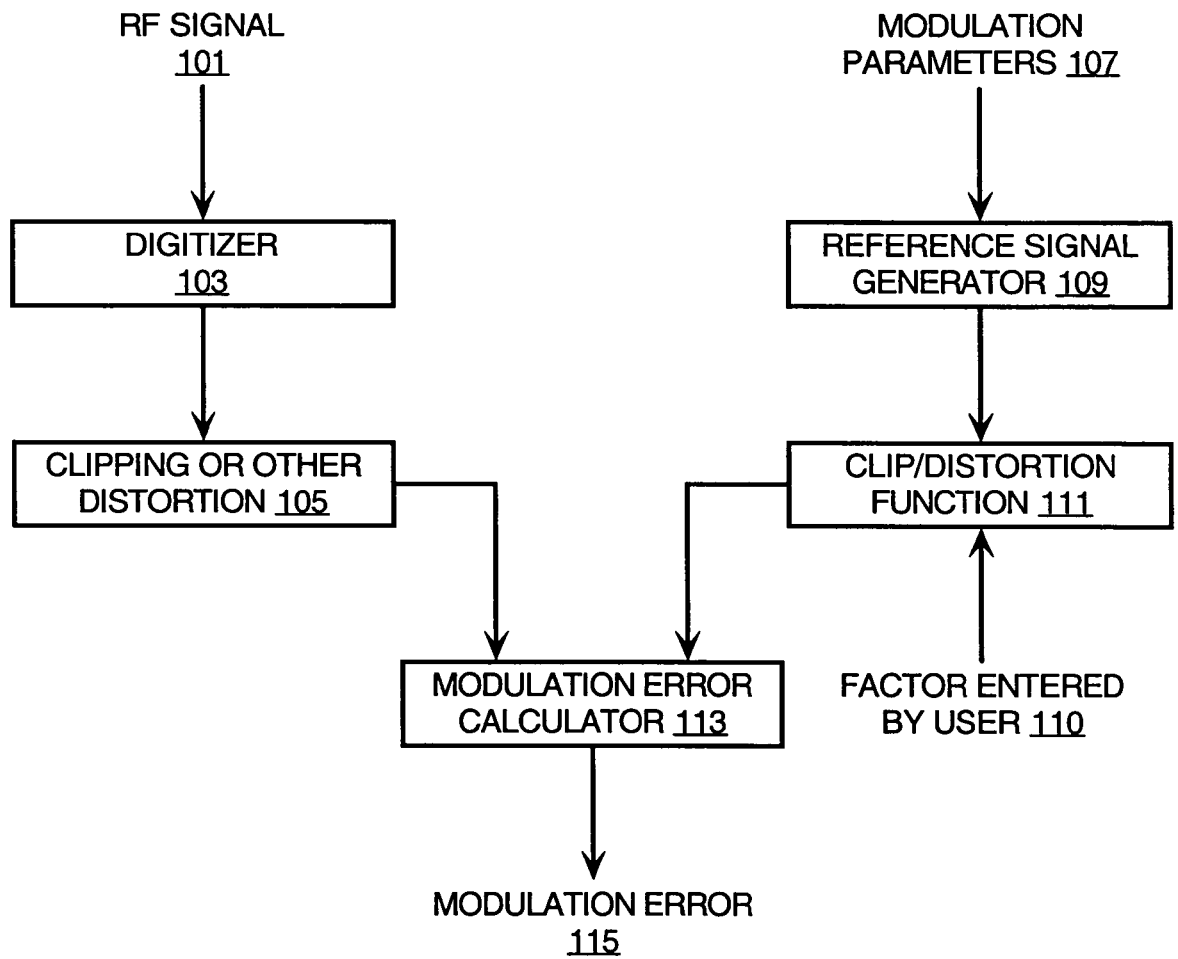
FIG. 1 shows a flow chart for measuring the modulation error in accordance with an embodiment of the present invention.

When generating the ideal reference signal (FIG. 1, 109) according to the invention by calculation or synthesis from the known sequence of the signal to be measured, not only are the modulation parameters (107) taken into consideration in the known manner; the distortion function (105) used in the signal (101) to be measured is additionally taken into account (111). Accordingly, the measured modulation error (115) attributable to distortion remains minimal; the modulation error caused, for example, by a power amplifier of a WCDMA base station, can be accurately measured (113) in a clipped signal, because it is no longer covered by the modulation error caused as a result of clipping. The method according to the invention can be used both with single-carrier and also with multiple-carrier high frequency signals, which are digitally modulated. It can be used for all signals, which are limited on the digital side (103) to a predetermined clipping factor. In the case of WCDMA signals according to the 3GPP standard, the base band signal is limited before filtering, for example, by clipping to 64% of the full amplitude in order to keep the crest factor of the signal as low as possible, which benefits the efficiency of the power amplifier used in the transmitter. Since different clip factors are conventional for each of the various types of signal, for which the method according to the invention is suitable, this parameter is preferably entered manually (110) into the measuring device and is then taken into account during the calculation of the reference signal. The method according to the invention can therefore be used by a simple extension, for example, in the signal analyzer FSIQ manufactured by Rohde & Schwarz. For the internal calculation of the ideal reference signal (109) in the measuring device, it is only necessary for the user to enter this clip factor (110), for example, in the case of WCDMA signals, of 64% of the full amplitude. This factor will then be taken into consideration in the calculation of the reference signal (109), and the vector or the I-values and/or Q-values of the reference signal can be calculated back.

The high frequency signal could also, for example, be limited by a so-called soft-clipping function, which is entered into the measuring device. In the same manner, when the reference signal is generated in the measuring device, other known signal distortion functions can be taken into consideration, for instance, functions for compressing high frequency signals, such as those used for various reasons in modern radio systems in the context of digital signal conditioning.

While the present invention has been described in connection with a number of embodiments and implementations, the present invention is not so limited but covers various obvious modifications and equivalent arrangements, which fall within the purview of the appended claims.

The invention claimed is:

1. A method for measuring a modulation error, comprising:
   receiving a signal having amplitude distortion or phase distortion on a digital side according to a predetermined function, the signal being a digitally modulated high frequency signal;
   locally generating an ideal reference signal;
   distorting the locally generated, ideal reference signal in accordance with said predetermined function; and
   comparing the signal with the distorted, locally generated, ideal reference signal to determine the modulation error.

2. A method according to claim 1, wherein:
   the ideal reference signal is generated locally by calculation, and the predetermined function can be set manually on a measuring device.

3. A method according to claim 1, wherein:
   the amplitude of the signal is limited on the digital side by a predetermined clip factor, and
   said predetermined function includes clipping the locally generated ideal reference signal in accordance with the predetermined clip factor.

4. A method according to claim 2, wherein:
   the amplitude of the signal is limited on the digital side by a predetermined clip factor, and
   said predetermined function includes clipping the locally generated ideal reference signal in accordance with the predetermined clip factor.

5. A method according to claim 1, wherein:
   said predetermined function includes a soft clipping function entered into a measuring device.

6. A method according to claim 1, wherein:
   said predetermined function includes high frequency signal compression.

7. A measurement device, comprising:
   means for receiving a signal having amplitude distortion or phase distortion on a digital side according to a predetermined function, the signal being a digitally modulated high frequency signal;
   a signal generator for generating an ideal reference signal;
   means for distorting the ideal reference signal in accordance with said predetermined function; and
   means for comparing the signal with the distorted, locally generated, ideal reference signal to determine modulation error.

8. A measurement device according to claim 7, wherein:
   the ideal reference signal is generated locally in the measurement device by calculation, and the predetermined function is set manually on the measurement device.

9. A measurement device according to claim 7, wherein:
   the amplitude of the signal is limited on the digital side by a predetermined clip factor, and
   said predetermined function includes clipping the locally generated ideal reference signal in accordance with the predetermined clip factor.

10. A measurement device according to claim 8, wherein:
    the amplitude of the signal is limited on the digital side by a predetermined clip factor, and
    said predetermined function includes clipping the locally generated ideal reference signal in accordance with the predetermined clip factor.

11. A measurement device according to claim 7, wherein:
    said predetermined function includes a soft clipping function entered into the measurement device.

12. A measurement device according to claim 7, wherein:
    said predetermined function includes high frequency signal compression.

13. A method for measuring a modulation error, comprising:
    receiving a signal having amplitude distortion or phase distortion on a digital side according to a predetermined clip factor, the signal being a digitally modulated high frequency signal;
    locally generating an ideal reference signal, at a measuring device, by calculation from bits and modulation parameters used for the digital modulation of the signal to be measured;
    entering the predetermined clip factor into the measuring device and distorting the locally generated, ideal reference signal in accordance with the predetermined clip factor; and
    comparing the signal with the distorted locally generated, ideal reference signal to determine the modulation error.

* * * * *